Figure 1:
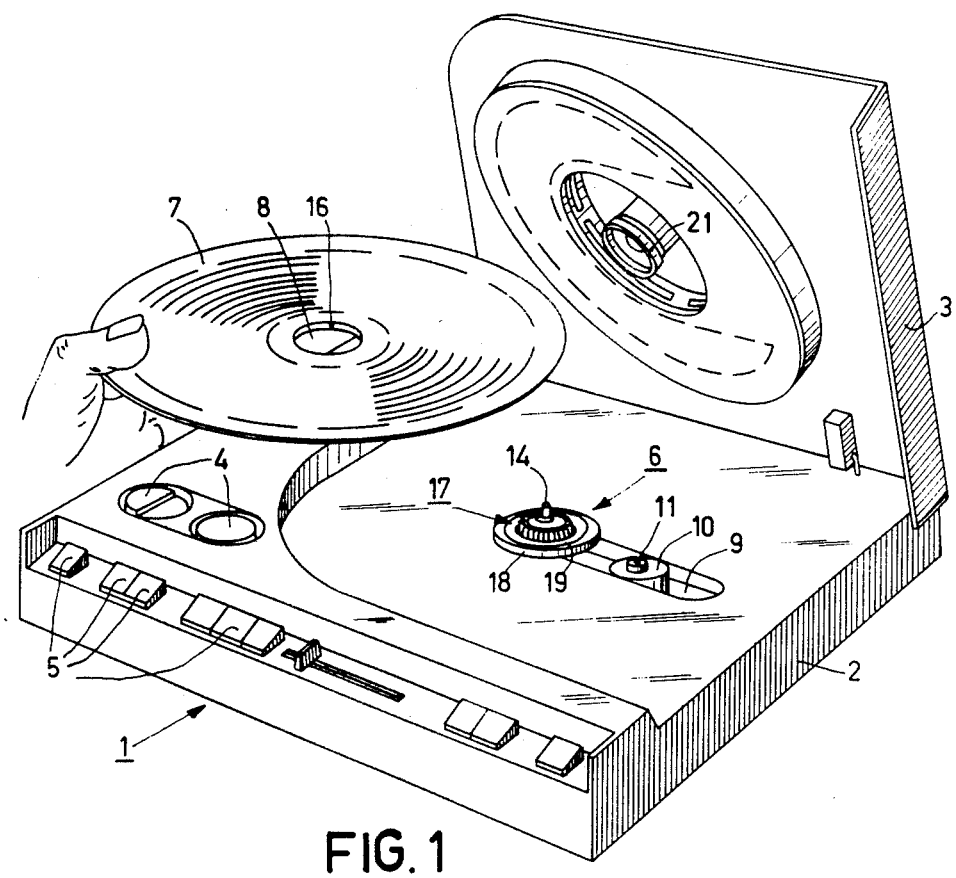

United States Patent [19]

Camerik

[11] Patent Number: 4,768,185
[45] Date of Patent: Aug. 30, 1988

[54] OPTICAL-DISC APPARATUS

[75] Inventor: Eduard Camerik, Eindhoven, Netherlands

[73] Assignee: U.S. Philips Corporation, New York, N.Y.

[21] Appl. No.: 401,662

[22] Filed: Jul. 26, 1982

[30] Foreign Application Priority Data

May 27, 1982 [NL] Netherlands .......................... 8202163

[51] Int. Cl.$^4$ ............................................. G11B 25/04
[52] U.S. Cl. .................................................... 369/270
[58] Field of Search ................. 369/77.2, 75.1, 75.2, 369/270, 266; 360/133

[56] References Cited

U.S. PATENT DOCUMENTS

| | | | |
|---|---|---|---|
| 3,156,472 | 11/1964 | Brock | 369/255 |
| 4,068,851 | 1/1978 | Yamamura | 369/266 |
| 4,218,065 | 8/1980 | van der Hoek et al. | 369/271 |
| 4,232,870 | 11/1980 | Iemeaschot | 369/270 |

FOREIGN PATENT DOCUMENTS 2909099 11/1980 Fed. Rep. of Germany.
149011 12/1978 Japan .................................. 369/270

Primary Examiner—Steven L. Stephan
Attorney, Agent, or Firm—Thomas A. Briody; Algy Tamoshunas

[57] ABSTRACT

The invention relates to an apparatus for playing back and/or recording information on rotary optical discs comprising a device for clamping the optical disc in position on a disc aligner mounted on a rotating spindle. The clamping device comprises a disc loader which moves with clearance in a support which is movable between a rest position and an operating position. The disc loader exerts a clamping force on the disc during operation due to a magnetic force between magnets secured to the disc loader and the support. Rattling and an oblique position of the disc loader are precluded in that the magnets are arranged to exert a magnetic force which acts between the support and the disc loader so as to clamp the disc loader against the support when the latter is not in its operating position.

5 Claims, 4 Drawing Sheets

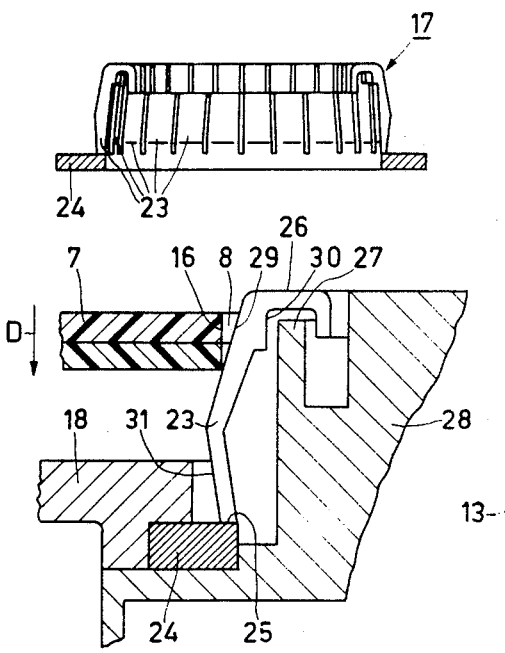
FIG.3
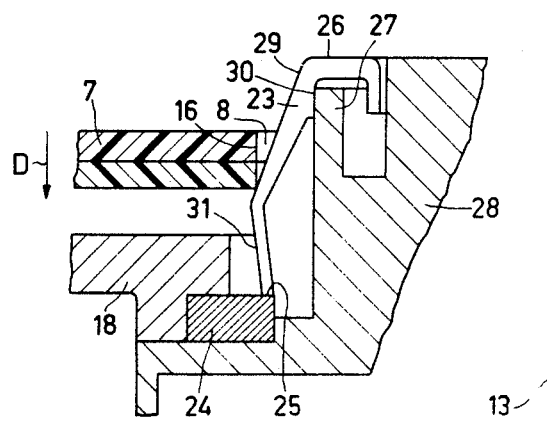
FIG.4a
FIG.4b

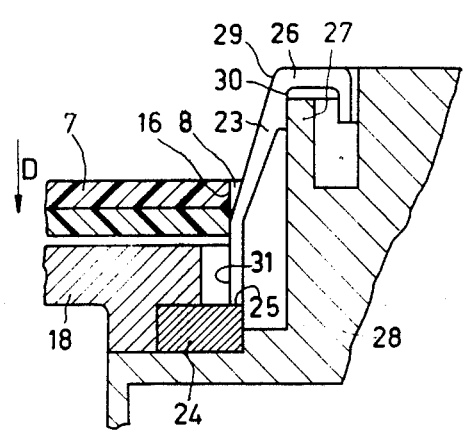
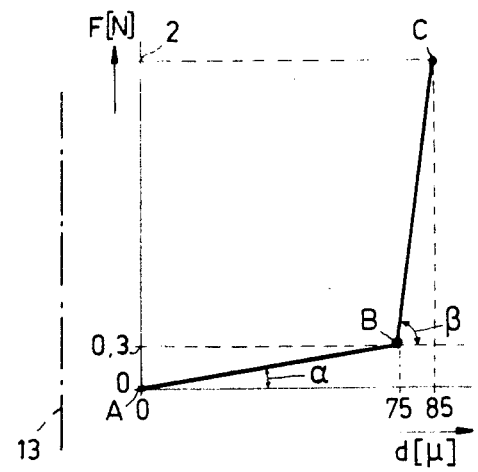
FIG.4c    FIG.5
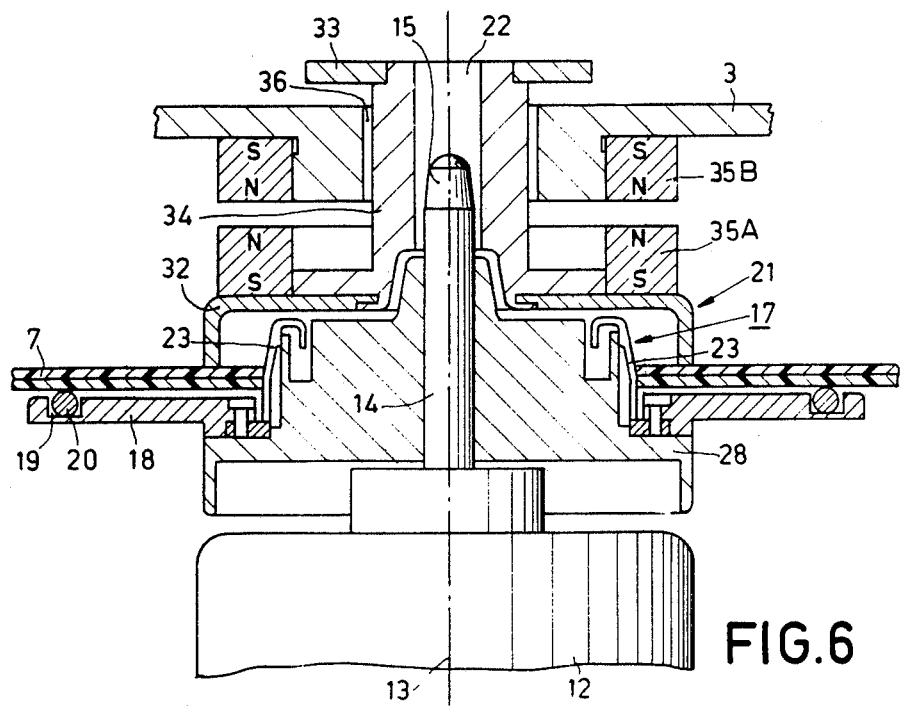
FIG.6

OPTICAL-DISC APPARATUS

The invention relates to an optical-disc apparatus for playing back and/or recording information on a rotary optical disc, which apparatus comprises a spindle with a free end which spindle is rotatable about an axis of rotation and a clamping device for clamping an optical disc onto the spindle, which device comprises: a disc loader comprising a thrust portion on a first side, which thrust portion, during operation, exerts pressure on an optical disc placed on the spindle and thereby presses said disc against the spindle, a second portion on a second side, and a central portion between the first and the second side, which central portion has a maximum transverse dimension which is smaller than that of the thrust portion and that of the second portion; permanent-magnetic means for magnetically urging the disc loader against the disc during operation; and a support for the disc loader, which support is movable between a rest position and an operating position and which has an opening through which the central portion of the disc loader extends with clearance, which opening has a maximum transverse dimension which is smaller than that of the second portion of the disc loader, which support allows the disc loader to rotate freely along with a disc when said support is in the operating position, which carries the disc loader when said support is in the rest position, and which co-operates with the second portion of the disc loader to move said disc loader away from the optical disc and thereby release the clamping of the disc on the spindle when the support is moved from the operating position to the rest position.

An optical-disc apparatus of this kind is known, for example, from U.S. Pat. No. 4,218,065 (herewith incorporated by reference). This known apparatus is an optical video-disc player which is equipped with a cover which can be swung open from an operating position in which it is closed, to place a disc onto or remove it from the spindle. The cover functions as the support for the disc loader. The thrust portion of the disc loader is ferro-magnetic and in the spindle a permanent magnet is arranged. After a disc has been placed onto the spindle the cover is closed, so that the disc loader is moved to a position opposite the spindle. The permanent magnet in the spindle now attracts the thrust portion of the disc loader so that the disc is pressed against a flanged-shaped disc drive member of the spindle.

In this known video-disc player the disc loader, at least its thrust portion, is visible when the cover is open. The central portion of the disc loader is arranged in the cover with a comparatively large play, so that the thrust portion may occupy a slightly oblique portion relative to the cover, which is considered to be less attractive from an aesthetic point of view. Moreover, the disc loader may rattle in the cover when the cover is moved between the operating position and the open position.

The invention aims at providing an optical-disc apparatus of the type mentioned in the opening paragraph which does not have these disadvantages and which has some important further advantages, depending on the embodiment, and is characterized in that the said permanent-magnetic means comprise means which exert a magnetic force which acts between the support and the disc loader and which magnetically clamp the disc loader against the support in the rest position.

When the support for the disc loader is moved from the operating position to the rest position the disc loader is magnetically clamped in a fixed position relative to the support, thereby precluding relative movements which may give rise to rattling. The advantage of the known apparatus that during operation the disc loader is not in contact with the support and can freely rotate along with the spindle is maintained. The invention has an additional advantage when the disc apparatus comprises a device for latching the support in the operating position, which device is of a type as described in U.S. Pat. No. 4,135,721 (herewith incorporated by reference). In the video-disc player known from this Patent Specification the cover is latched automatically upon closure. The cover may be unlatched manually or automatically by the video-disc player itself, a leaf spring pushing the cover slightly upwards. In a video-disc player in accordance with the present invention such a leaf spring is not needed because the clamping device for clamping the disc on the spindle comprises magnetic means which urge the cover away from the spindle. Thus, the cover cover is loaded magnetically towards the open position.

The video-disc player in accordance with the previously mentioned U.S. Pat. No. 4,218,065 employs a centring device comprising a spring assembly for centring the video disc on the spindle. The spindle carries a substantially frusto-conical centring member whose circumferential surface is formed with a large number of slits. The portions separated by the slits are interconnected at the base of the cone and function as bar springs. The video disc has a central hole which is engaged by the centring member, for which the disc must be pressed onto the spindle with some force in order to deflect said bar springs slightly. Normally, this will not present any problems; however, it has been found that in some cases the tolerances of the dimensions of the central hole in the video disc and those of the dimensions of the spring assembly may accumulate unfavourably in such a way that the video disc has to be pushed onto the centering member by the user with some effort. If this is not done or not done correctly, the disc loader is no longer capable of urging the disc into its correct position. This problem becomes even more serious if the optical-disc apparatus does not comprise a cover but has a slot for inserting the disc. In the case of such optical-disc apparatus the user of the apparatus cannot press the disc manually into the correct position on the spindle. An embodiment of the invention which is favourable in this respect is characterized in that the magnetic means comprise means which exert a magnetic tensile force which acts between the support and the disc loader.

When the disc loader in the last-mentioned embodiment is lowered into the disc, it sticks to the magnet so that a high initial press-down force exists. When the support moves further to its ultimate operating position a maximal force is initially exerted on the disc. At a given instant the disc loader is pulled off the magnet and an air gap is formed between the magnet and the co-operating portion of the disc loader. As a result of this the force exerted on the disc loader is reduced. During operation the disc loader exerts a smaller force on the disc than when the disc is pushed over the centring member. This has the additional advantage in that during operation, the spindle is subject to an axial force which is not greater than necessary for retaining the disc. A greater force is produced only temporarily when the disc is pushed over the centring member.

A favourable construction of the clamping device in the embodiment of the invention described in the foregoing paragraph is obtained in a further embodiment which is characterized in that: the second portion of the disc loader comprises a ferro-magnetic ring; the permanent-magnetic means comprise an axially magnetized annular permanent magnet which is mounted rigidly on the support and which is arranged concentrically with the central portion of the disc loader; and in the operating position of the support, when an optical disc has been placed on the spindle, a narrow axial air gap is formed between said annular magnet and said ferro-magnetic ring.

This embodiment comprises few components and further has the advantage that the second portion of the disc loader co-operates with a large surface area of the magnet and is consequently retained in the rest position of the support with a comparatively great attractive force, thereby enabling a comparatively great force to be exerted on the disc when it is pushed over the centering member.

It is advantageous to use an embodiment of the invention which, in addition to the permanent-magnetic means of one of the embodiments of the invention described in the foregoing, comprises permanent-magnetic means which, as is known from the previously mentioned U.S. Pat. No. 4,218,065, comprise means for exerting a magnetic tensile force which acts between the spindle and the disc loader. Thus, in this embodiment magnetic forces act both between the spindle and the disc loader—which forces do not subject the spindle to an axial loader during operation—and between the disc loader and the support. This embodiment comprises two different kinds of magnetic means and during operation two different air gaps are formed between portions of the disc loader and the magnetic means. This has the advantage that a greater freedom of design is obtained as regards the choice of the magnetic means, the forces required for pushing the disc over the centring means, the clamping forces obtaining during operation, and the axial load to which the spindle is subjected.

Figure 2:
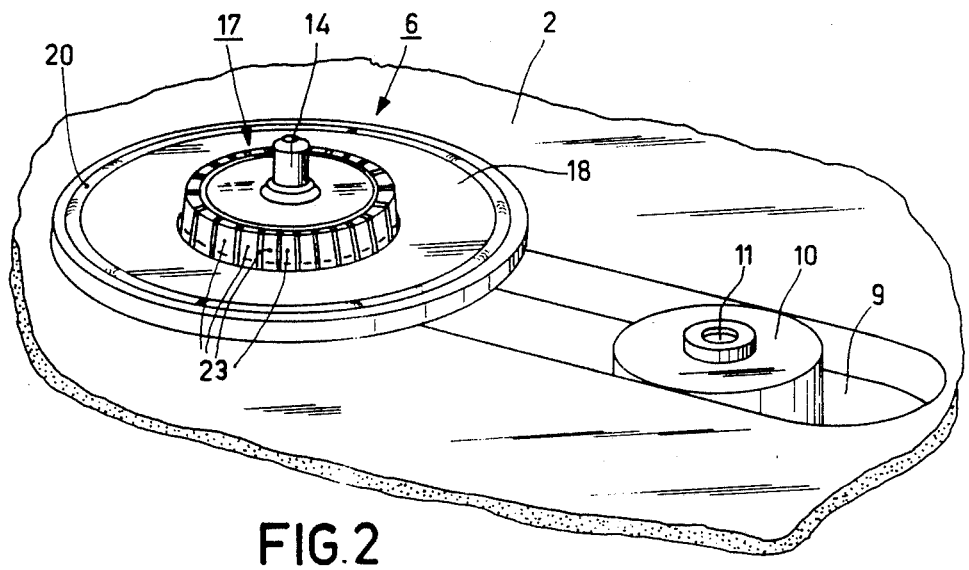
Figure 7:
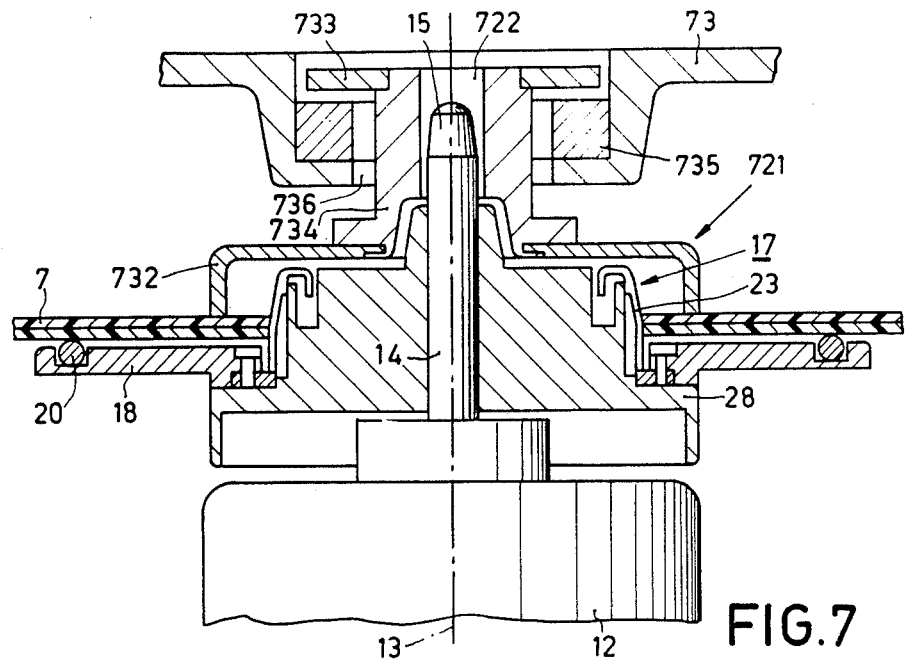
Figure 8:
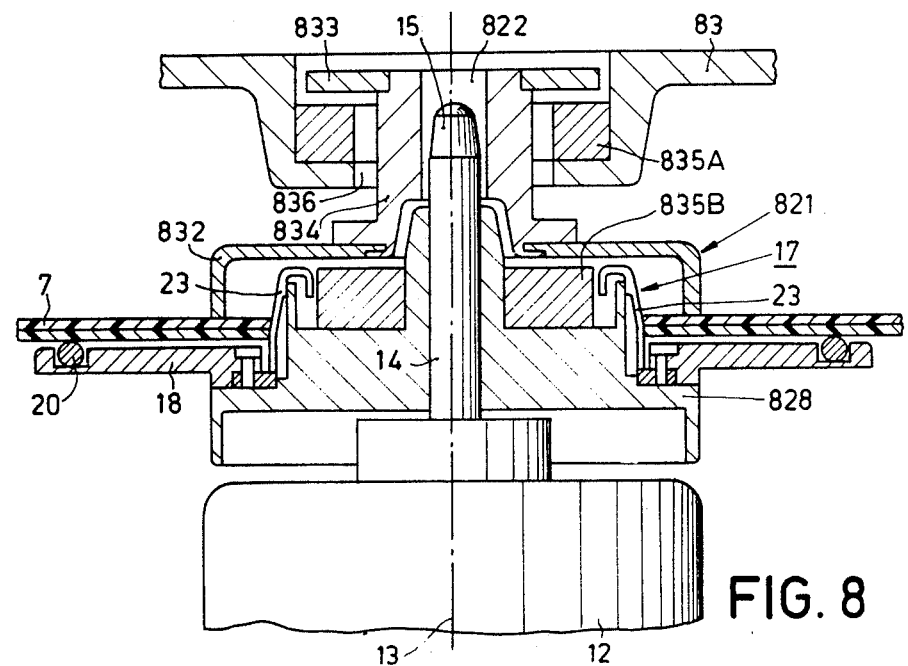

The invention will now be described in more detail, by way of example, with reference to the drawing, in which:

FIG. 1 is a perspective view of an optical-disc apparatus in the form of a video-disc player comprising a cover and a clamping device for clamping a video disc on a spindle, FIG. 2 shows a detail of FIG. 1 on an enlarged scale, FIG. 3 is a cross-section of a centering member which is manufactured integrally from a plastics, FIGS. 4A, B and C show a detail of FIG. 3 on an enlarged scale, a video disc being disposed in different positions relative to the centring member in the respective Figures, FIG. 5 shows a spring characteristic of the centering member shown in FIG. 4, FIG. 6 is a partial cross-section of the clamping device of the video-disc player shown in FIG. 1 in a first embodiment of the invention, FIG. 7, in the same way as FIG. 6, is a cross-section of a second embodiment of the invention, FIG. 8, in the same way as FIG. 6, is a cross-section of a third, preferred, embodiment of the invention.

In the Figures corresponding parts bear the same reference numerals.

The video-disc player 1 shown in FIG. 1 comprises a housing 2 and a support in the form of a hinged cover 3. At the front of the housing there are arranged a member of keys 4 and 5 for the actuation of the various functions of the apparatus. At a central location there is arranged a centring device 6 for centring and aligning a video disc 7, which disc has a disc hole 8. The disc is placed on the centring device 6 and, after it has been clamped in position by means of a clamping device to be described it is rotated with the required speed of 1500 or 1800 revolutions per minute, depending on whether the line frequency is 50 or 60 Hz. Adjacent the centring device, a radial slot 9 is formed in the upper surface of the housing 2, in which slot a focusing device 10 is movable in a radial direction by means, not shown, which are accommodated in the housing. The device comprises an objective 11 by means of which a light beam from a laser source, not shown, can be focused onto the lower surface of a disc and by means of which the light reflected by the disc can be passed to photoelectric information-detection device inside the housing 2.

A drive motor 12, see FIG. 6, comprises a spindle 14 which is rotatable about an axis of rotation 13 and which has a slightly conical free end 15. Near the free end 15 there is disposed a centring member 17 which co-operates with the wall 16 of the central disc hole 8 of the video disc 7 in the operating position of the disc. Furthermore, the spindle carries a disc aligner 18 which belongs to the clamping device and which takes the form of a flange, for aligning the disc in a plane perpendicular to the axis of rotation of the spindle. The video disc is positioned on a hard-rubber ring 20 arranged in an annular groove 19. The cover 3 carries a disc loader 21 which can be moved to a position opposite the centring member 17, which presses on the video disc in the operating position and which belongs to the clamping device, for loading the disc towards the ring 20 of the disc aligner 18 and thereby retaining the disc on the spindle. The disc loader has a bore 22 which fits around the spindle 14 with clearance.

The centring member 17 comprises a plurality of centring elements 23 which are radially movable between a first position (see FIG. 4A) and a second position situated near the axis of rotation 13 (see FIG. 4C). These elements have the form of bar springs whose fixed ends are connected to the drive spindle and together with a retaining ring 24 they are injection-moulded integrally from a plastics, see FIG. 3. The centring elements are movable against their resilient action by co-operation with the wall 16 of the disc hole 8 in the video disc 7 when this disc is placed onto the drive spindle.

The centring elements 23 have an angular shape, at least at their sides which are remote from the axis of rotation 13, so that together, at their sides nearer the free end of the spindle, they constitute an interrupted truncated cone having a transverse dimension which varies from smaller than the diameter of the disc hole of the video disc to greater than the diameter of this hole. At their sides which are more remote from the free end of the spindle when the video disc is in the operating position, they form together an interrupted cylinder with a transverse dimension equal to the disc hole diameter. The spring constant of the centring elements varies from smaller to greater when a disc is put on.

FIGS. 4A to 4C show how a centring element 23 is moved from its first position to its second position when the video disc 7 is put on. Each of the centring elements has a fixed end 25 which is connected to the retaining ring 24 and a free end 26 on the opposite side. This free end is hook-shaped and engages with a stop 27 which forms part of a body 28 which has been shrunk onto the spindle 14. FIG. 4A shows the situation in which the wall 16 of the disc hole 8 of the video disc 7 just contacts the oblique portion 29 of the centring element 23 when the video disc is moved downwards in the same direction as the arrow D. During a further downward movement in the same direction as the arrow D, as a result of the co-operation of the wall 16 of the disc hole 8 and the centring element 23, the last-mentioned element is moved towards the axis of rotation 13 of the drive spindle until the position of FIG. 4B is reached, in which a stop edge 30 just contacts the stop 27. Between the position of the centring element 23 shown in FIGS. 4A and 4B this element pivots about is fixed end 25. However, when the situation of FIG. 4B is reached a further pivotal movement of the centring element is no longer possible as a result of the co-operation of the stop portion 30 of the centring element with the stop 27. A graph in FIG. 5 shows how a pivotal force F exerted on the centring element 23 and acting towards the axis of rotation 13 varies between the situations shown in FIGS. 4A and 4B. In point A of the graph, which corresponds to the situation in FIG. 4A, the force F is of course zero. In point B the situation of FIG. 4B is obtained and the force is 0.3 Newtons after a displacement d of 75 microns. The spring constant, which is defined as the quotient of the force F in Newtons divided by the displacement d in microns, is constant over the entire range between the points A and B and is equal to tan $\alpha$. Starting from the situation shown in FIG. 4B, the situation of FIG. 4C is obtained ultimately upon a further displacement of the disc in the direction D, so that the disc 7 will be disposed on the ring 20 in the flange 18. The deformation to which the centring element 23 is then subject demands a greater force acting towards the axis of rotation 13, so that the required force F between points B and C in the graph of FIG. 5 increases from 0.3 to 2 Newtons for a displacement of 10 microns. In this range the spring constant is tan $\beta$. During this last stage of the displacement of the disc 7 the wall 16 of the disc hole 8 moves from the oblique portion 21 towards the portion 31 of the centring element. The surfaces 31 of the centring elements 23 together form an interrupted cylinder in the situation shown in FIG. 4D. The correct centring of the disc on the spindle is obtained by co-operation of the wall 16 with the portion 31 of the centring elements 23, said uninterrupted cylindrical surface being concentric with the axis of rotation 13. The accuracy of this concentricity is improved by the cylindrical shape of the stop 27, which constitutes a cylindrical stop member which is mounted rigidly and coaxially on the drive spindle, for all centring elements 23. Variations in the dimensions of the disc hole and the centring member give rise to comparatively large variations in the magnitude of the force required to press the disc over the centring member onto the ring 20.

The disc loader 21, see FIG. 6, comprises a thurst portion 32 on a first side which portion during operation exerts pressure on the optical disc 7, a second portion 33 on a second side, and a central portion 34 between the first and the second side. These portions all have a circular cross-section, the diameter of the central portion 34 being smaller than the diameters of the first portion 32 and the second portion 33. For magnetically urging the disc loader 21 onto the disc 7 during operation there are provided magnetic means in the form of two annular permanent magnets 35a and 35b. The cover 3, which constitutes a support for the disc loader 21, which support can be moved between a rest position and an operating position, is formed with an opening 36 through which the central portion 34 of the disc loader extends with clearance. This opening has a circular cross-section of a diameter smaller than the diameter of the second portion 33 of the disc loader. As is apparent from FIG. 6, the cover 3, when it is in the operating position, is positioned relative to the disc loader 21 such that the disc loader can rotate freely along with the video disc. In the rest position of the support, which in the present case corresponds to the open position of the cover 3 as shown in FIG. 1, the disc loader is no longer disposed on the video disc but is carried by the cover. When the cover is moved from the operating position to the rest position the cover co-operates with a second portion 33 of the disc loader 21, moving said disc loader away from the disc and thereby releasing the video disc from the spindle.

Said permanent magnets 35a and 35b are glued to the disc loader 21 and to the cover 3 respectively. They are axially magnetized and arranged in such a way that they face each other with surfaces of like polarity; consequently they repel each other. In FIG. 6 the magnetic north-pole side and the magnetic south-pole side of the magnets are designated N and S respectively. This results in a magnetic force which acts between the support and the disc loader, which force in the rest position of the cover urges the second portion 33 of the disc loader 21 against the upper side of the cover 3, so that the disc loader is clamped against the cover. In the operating position, see FIG. 6, the cover 3 has been moved so far that the second portion 33 is no longer in contact with the cover 3. The air gap between the two magnets 35a and 35b in the operating position of the cover 3 is therefore smaller than in the rest position. When the cover is moved from the rest position to the operating position, the pressure exerted on the video disc will consequently increase from the instant that the disc loader 21 rests on the video disc 7. The repelling forces acting between the magnets 35a and 35b provide the clamping force for clamping the video disc 7 on the spindle 14 and they act also on the cover, so that when the cover is unlatched the magnetic force between the two magnets moves this cover into a position in which the cover 3 is again in contact with the second portion 33 of the disc loader 21.

FIGS. 7 and 8 relate to two further embodiments of the invention. The Figures show two modifications to the video-disc player shown in FIG. 1, using clamping devices of a different construction. Only those parts which have been modified in comparison with FIG. 6 are designated by different reference numerals, all identical parts bearing the same reference numerals as in FIG. 6. The modified parts in FIG. 7 bear the same reference numerals as the corresponding parts in FIG. 6, but preceded by the digit 7. In a similar way, the modified parts in FIG. 8 bear the same reference numerals as the corresponding parts in FIG. 6, but preceded by the digit 8. For convenience, the embodiments shown in FIGS. 7 and 8 will be described only in so far as they differ from the embodiment shown in FIG. 6.

The clamping device shown in FIG. 7 comprises magnetic means in the form of a permanent magnet 735 which exerts a magnetic tensile force between the support 73 and the disc loader 721. The second portion 733 of the disc loader 721 comprises a ferro-magnetic flange. The permanent magnet 735 is an axially magnetized annular permanent magnet 735 which is arranged concentrically with the central portion 734 of the disc loader and which is rigidly mounted on the support 735. The Figure shows the operating position of the support 73, a small axial air gap existing between the magnet 735 and the ring 733. When the support 73 is moved upwards the ferro-magnetic ring 733 sticks magnetically to the magnet 735. When the support 73 moves towards the operating position a comparatively great force has to be overcome before an air gap is formed between the ferro-magnetic ring 733 and the magnet 735. This great force, as already stated, is favourable for overcoming the force required to push the video disc 7 over the centring member 17. During operation, as a result of the presence of the air gap between the ring 733 and the magnetic 735, a smaller axial force exists, which is sufficient to clamp the video disc 7 on the flange 18 but which is not greater than necessary.

The clamping device shown in FIG. 8 may be regarded as a combination of the clamping device used in the previously mentioned known video-disc player described in U.S. Pat. No. 4,218,065 and the clamping device shown in FIG. 7. The body 828 on the spindle 14 has been modified slightly and now carries a second annular magnet 835. The first portion 832 of the disc loader 821 and the second portion 833 are ferro-magnetic and the first portion is attracted by the axially magnetized annular magnet 835B in the operating position. The attracting force between the magnet 835B and the thrust portion 832 increases the clamping force with which the video disc 7 is pressed onto the ring 20 of the flange 18 without thereby increasing the axial load exerted on the spindle 15. If desired, the strength of the magnet 835A may be smaller than the strength of the permanent magnet 735 shown in FIG. 7. Also, the magnet 835A may be smaller.

Although the various embodiments of the invention have been described for a video-disc player comprising a cover which functions as support for the disc loader, the invention is not limited to such video-disc players. The invention may be used with advantage in other optical-disc apparatus. For example, the invention may be utilized in a video-disc player in which the disc is inserted through a slot in the front and in which the support comprises a movable support arranged in the interior of the player. Moreover, the invention may not only be applied to video-disc players but also to optical disc apparatus for recording and/or reproducing audio signals, computer information etc. The construction of the clamping device may be modified in various manners without departing from the scope of the invention. The parts of the disc loader need not be of circular cross-section, the permanent magnets need not be annular but may, for example, comprise a plurality of separate block-shaped magnets. Furthermore, the clamping device may be combined with centring devices on the drive spindle of a different shape, for example the fixed cone known from U.S. Pat. No. 3,980,308 (herewith incorporated by reference). In such a centring device the edge of the disc hole engages with the circumferential surface of the cone. Therefore, no increased initial force is required for placing the disc correctly onto the spindle. Then, an embodiment of the invention may be used which combines the magnet 835B in the spindle shown in FIG. 8 with the magnets 35A and 35B shown in FIG. 6. The last-mentioned magnets then mainly serve to clamp the disc loader against the cover when this disc loader is not in the operating position. The repellent magnetic force between these two magnets need not be greater than strictly necessary for this purpose.

What is claimed is:

1. An apparatus for playing back and/or recording information on a disc having a central hole, said apparatus comprising a housing, an elongated spindle, means mounted in said housing for rotating said spindle about the longitudinal axis thereof, an aligning member for supporting the disc in plane perpendicular to said axis, said aligning member being secured to said spindle for rotation therewith, a centering member mounted on said spindle for rotation therewith, said centering member having a plurality of radially movable resilient members disposed about said axis and defining a generally frusto-conical centering surface which extends about said axis and tapers away from said aligning member, said centering surface being configured to engage the central hole of the disc and center the disc about said axis, a disc loader having a thrust portion configured to engage the central portion of the disc during operation when the disc is supported by said aligning member, a support member secured to said housing for movement between a rest position and an operating position, said disc loader being supported by said support member for rotation and movement relative to said support member in a first direction such that when said support member is in said operating position and said thrust portion is in clamping engagement with the disc supported by said aligning member, said first direction is generally parallel to said axis and said disc loader is free to rotate with said disc, a first and second ferromagnetic member at least one of which is a magnet, a respective one of said first and second members being arranged on said disc loader and said support member, said first and second members being disposed in a position relative to each other such that when said support member moves from said rest position toward said operating position, said first and second members are initially in contact with and stick to each other with sufficient initial magnetic force for said thrust portion to engage the disc and push the central hole over said centering member so that said resilient members engage the wall of the central hole, are moved radially towards said axis and exert a resilient force on the wall of the central hole to thereby center the disc about said axis as the disc is positioned on said aligning member, said first and second members being further arranged relative to each other such that as said support member subsequently moves into said operating position, said first and second members are pulled apart due to relative movement between said disc loader and said support member in said first direction so as to form an air gap of predetermined width therebetween such that said first and second members exert a magnetic force lower than said initial force on said disc loader so as to maintain said thrust portion in clamping engagement with the disc during operation.

2. The apparatus according to claim 1 wherein said support member has an opening formed therein and said disc loader has a central portion which extends through said opening with a clearance therebetween, one end of said central portion being attached to said thrust portion, and the other end of said central portion being secured to one of said first and second members, said first and second members being arranged relative to each other such that as said support member moves from said operating position to said rest position, said first and second members come into contact with and stick to each other thereby clamping said disc loader to said support member so as to prevent relative movement therebetween.

3. The apparatus according to claim 2 wherein said first and second members are annular, said one of said first and second members and said thrust portion being larger than said opening in said support member, and said other of said first and second members is disposed about said opening at a position relative to said disc loader which is between said one of said first and second members and said thrust portion.

4. The apparatus according to claim 1 or 2 wherein at least a portion of said thrust portion is ferromagnetic and including a further magnet secured to said centering member at a position so as to exert an attractive magnetic force on said thrust portion when said support member is in said operating position so as to increase the clamping force exerted by said thrust portion on the disc during operation.

5. The apparatus according to claims 1, 2 or 3 wherein said first and second members are both magnets.

* * * * *